(12) United States Patent
Fouts (10) Patent No.: US 8,479,094 B2
(45) Date of Patent: Jul. 2, 2013

(54) INTERACTIVE WRITING AID TO ASSIST A USER IN FINDING INFORMATION AND INCORPORATING INFORMATION CORRECTLY INTO A WRITTEN WORK

(76) Inventor: Kenneth Peyton Fouts, Lexington, KY (US)

( * ) Notice: Subject to any disclaimer, the term of this patent is extended or adjusted under 35 U.S.C. 154(b) by 669 days.

(21) Appl. No.: 12/584,529

(22) Filed: Sep. 8, 2009

(65) Prior Publication Data

US 2011/0060761 A1  Mar. 10, 2011

(51) Int. Cl.
*G06F 17/30* (2006.01)
(52) U.S. Cl.
USPC ........... 715/271; 715/255; 715/270; 707/770; 707/E17.071
(58) Field of Classification Search
USPC .......................................... 715/255; 707/770
See application file for complete search history.

(56) References Cited

U.S. PATENT DOCUMENTS

| | | | | |
|---|---|---|---|---|
| 5,418,908 | A * | 5/1995 | Keller et al. | 709/206 |
| 6,122,647 | A * | 9/2000 | Horowitz et al. | 715/205 |
| 7,107,284 | B1 * | 9/2006 | Betz et al. | 1/1 |
| 7,143,348 | B1 * | 11/2006 | Krause | 715/236 |
| 7,526,477 | B1 * | 4/2009 | Krause | 1/1 |
| 8,146,156 | B2 * | 3/2012 | King et al. | 726/21 |
| 8,170,868 | B2 * | 5/2012 | Gamon et al. | 704/9 |
| 8,275,776 | B2 * | 9/2012 | Krause | 707/742 |
| 2004/0002849 | A1 * | 1/2004 | Zhou | 704/4 |
| 2005/0005239 | A1 * | 1/2005 | Richards | 715/530 |
| 2005/0188322 | A1 * | 8/2005 | Napoleon | 715/760 |
| 2006/0218492 | A1 * | 9/2006 | Andrade | 715/523 |
| 2006/0287971 | A1 * | 12/2006 | Armstrong | 707/1 |
| 2008/0071803 | A1 * | 3/2008 | Boucher | 707/100 |
| 2008/0077870 | A1 * | 3/2008 | Napoleon | 715/762 |
| 2008/0127091 | A1 * | 5/2008 | Ericsson et al. | 717/123 |
| 2008/0178077 | A1 * | 7/2008 | Boucher | 715/266 |
| 2009/0287988 | A1 * | 11/2009 | Cohen et al. | 715/204 |
| 2009/0300046 | A1 * | 12/2009 | Abouyounes | 707/102 |
| 2011/0060761 | A1 * | 3/2011 | Fouts | 707/770 |

OTHER PUBLICATIONS http://web.archive.org/web/20080604173703/http://www.refman.com/ posted as of Jun. 4, 2008 Thompson Reuters.*
Reference Manager 11 Bibliographies made easy on your desktop and the Web, published by Thompson Reuters, available at http://www.refman.com as of Jun. 4, 2008.*
Googlepedia: The Ultimate Google Resource, Third Edition by: Michael Miller Publisher: Que Pub. Date: Oct. 29, 2008.*

* cited by examiner

*Primary Examiner* — William Bashore
*Assistant Examiner* — Nathan Shrewsbury
(74) *Attorney, Agent, or Firm* — Middleton Reutlinger; Scott W. Higdon

(57) ABSTRACT

A machine and computer-implemented process that assists a user in authoring any written work in that it automatically searches multiple sources simultaneously on the world wide web or other designated database in order to provide automatic citation and/or information suggestions to an author's written work. The invention parses and sorts both user entered information and returned search results to create databases which assist in suggesting the most relevant information and citation suggestions to the user. The machine and computer-implemented process also provide automatic formatting, in a user pre-selected style, of both the written work and the citations which are automatically generated and suggested to the author based upon user defined presets and relevancy criteria. The invention described assists a user in finding information and the next step in a variety of processes.

18 Claims, 5 Drawing Sheets

INTERACTIVE WRITING AID TO ASSIST A USER IN FINDING INFORMATION AND INCORPORATING INFORMATION CORRECTLY INTO A WRITTEN WORK

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

Writing is a common activity among a variety of professional and scholastic disciplines. Every person who receives an education in the United States, and many other countries, will likely be required to write a paper for a class. Many professions require writing of technical papers, reports, articles, or operative documents.

Searching for relevant sources for a written work is often a time consuming and laborious process. In order to find these details an author must stop writing and take time to search through a library, database, text, or the Internet. The author must then incorporate the data found into their written work. A machine and computer-implemented process which automatically searches databases and uses Internet search technologies to gather data and provide literary citation suggestions in real-time as the author is writing their work would save the author time and energy. An invention that allowed users to select the desired information from a list of suggestions and then incorporated user selected information into the written work with the correctly formatted citation and bibliography information would save authors time in research and citation of sources.

Correct formatting and citation of sources in a written work is required in many types of writing disciplines and professions. One individual may be called upon to write works in different disciplines or professions over the course of their lives. A system, method, and/or process for automatically formatting written works to the required style would be helpful to the user.

Citation to sources is required in many types of writing. Academic papers, scholarly articles, legal writing, textbooks, magazine articles, and Internet publications are some of the written works which sometimes require citation to the sources of the information contained in these written works. Citations are required to be formatted in a standard form depending on the style of the document being written. The elements of a typical citation generally contain information regarding the author, title of the work cited, page numbers of the relevant sections of the cited work and information regarding the publisher of the cited document and the year published. The order and style of these citation elements are dictated by the rules of each style format for writing. Citation rules vary based on the format required by the author. When an author is writing a written work their writing is expected to follow a certain stylistic format (for example: APA style is used in the field of psychology and political science; MLA style is used by English writing; Chicago style is used by history and religion). The citation and formatting rules for each style often differ in the way that papers are structured, especially in the way that sources for information are formatted and publishing authorship of sources information is arranged within the citation.

Citation of sources is often a time consuming and labor intensive task. Even more time consuming can be the task of finding sources for information presented in a written work. Often an author is familiar with an idea or the subject matter on which they are writing without knowing specific details. The author must then provide a citation to the reference from which the information was gathered.

Students often loose grading points for incorrectly formatting sources and citing sources in scholastic papers because of unfamiliarity with the technical citation differences between styles. An invention which would correctly format both the written work and the sources for the information selected by the user would be very helpful.

There are many fields where the need to find and incorporate information as described above can be useful. Any field that requires a "next step" would benefit from the above described invention. Many professions require finding a solution, diagnosis, prescription or other information; finding that information is often time consuming and requires sorting through many possibilities. It would be helpful for a professional to be able to enter information regarding a problem or project into a system and while they are entering such information the invention would automatically search databases or selected information sources and suggest solutions to the problem presented in real time.

In the area of legal writing a user often needs to find information or cite information. The described invention would be useful for suggestion case citations and providing information in real time to the author of a writing.

1. Technical Field

The present invention is generally directed to assisting with authorship of written works in various style formats and disciplines and to automatic citation suggestion and implementation into written works based upon integrated real-time database and world wide web search criteria and user defined parameters. The present invention provides a computer-implemented process and machine for filtering and automatically manipulating data resulting from existing search technologies and then allowing the user to automatically integrate relevant data, as well as a properly formatted citation into a written work. They machine and process also can suggest the next step in a medical, legal or engineering process from searching a database in real time.

2. Description of the Prior Art

There is no known machine or computer-implemented process in the Prior Art, which performs the function of this machine and computer-implemented process.

Present computer-implemented processes and machines for citation search consist of a user physically searching a library catalog, other searchable database or the world wide web. Once an entry, document, or written work, are found which satisfy the user's query, that entry then must be read the user who must then select the relevant information. Once relevant information is selected, the user must manually format the citation of the reference they have found.

Prior art consists of computer-implemented processes of automatic formatting in a user selected style of user entered information. For example, if a user wished to format a citation in MLA format, a user could use prior art to enter information for the author, publication, page and date, of a source. Prior art would then organize and render the user entered data in the correct format.

U.S. Pat. Nos. 6,289,342 and 6,738,780 disclose a system which parses citations from papers and identifies citations to the same paper that may differ in syntax as well as extracting and providing the context of citations to a given paper, allowing a researcher to determine what is published in other papers about a given paper.

U.S. Pat. No. 7,028,259 discloses a method for verifying stylistic accuracy of existing legal citations, and for displaying and implementing corrections of inaccurate legal citations.

No prior art has been found which automatically provides information and citation suggestions in real time or that allows an author to incorporate selected citations directly into a written work.

SUMMARY OF THE INVENTION

The objective of the present invention is to provide a machine and a computer-implemented process for the real time formatting of written works and automatic citation and source suggestion and formatting which reduces time and effort on the part of the author.

The claimed invention automatically, in real-time, searches user specified databases, resources and/or the world wide web in order to suggest to the user relevant information to be incorporated as data, citation, and bibliography entries into the user's written work.

The machine and computer-implemented process allow a user to begin authoring a written work.

While the user is authoring the written work the machine communicates with other machines, servers, search databases and resources. In real time, the machine then suggests to the user information relevant to the work being authored. Suggestions are made on the basis of information returned from relevant or user defined databases searched. The user may select or decline the suggestions made by the machine. User accepted suggestions are automatically integrated, in the correct user defined formatting, into the written work. A citation for the user accepted selection is automatically added to the correct place in the document as well as any required bibliography.

The invention also learns, recognizes and predicts user intent by analyzing their previous writing patterns, resources selected, and citations used. In addition, the machine uses collective non-personal usage information from other willing users of the system to create a database that can determine the type of written material and predict which packets of information would be most commonly used in similar circumstances. In addition, the machine checks and warns of plagiarism if the system finds material too similar to the user's written work. This saves time and effort on behalf of a user. All of this is accomplished through the direction of the computer code, which guides the machine.

Although modifications and changes may be suggested by those skilled in the art, it is the intention of the inventors to embody within the patent warranted herein all changes and modifications as reasonably and properly come within the scope of their contribution to the art.

DETAILED DESCRIPTION OF THE INVENTION

The invention consists of a machine and/or computer-implemented process, which is used to write a written work by an author or user. The invention can be accessed remotely through a wireless device such as an iPhone® or Blackberry®, connecting through a wireless network, or through a user terminal such as a personal computer connected to other computers and servers through a LAN, WAN, Cable, DSL, T1, T3, or other connection. The invention provides a platform for authoring written works, which can be accessed anywhere a connection can be made to the invention.

Figure 1:
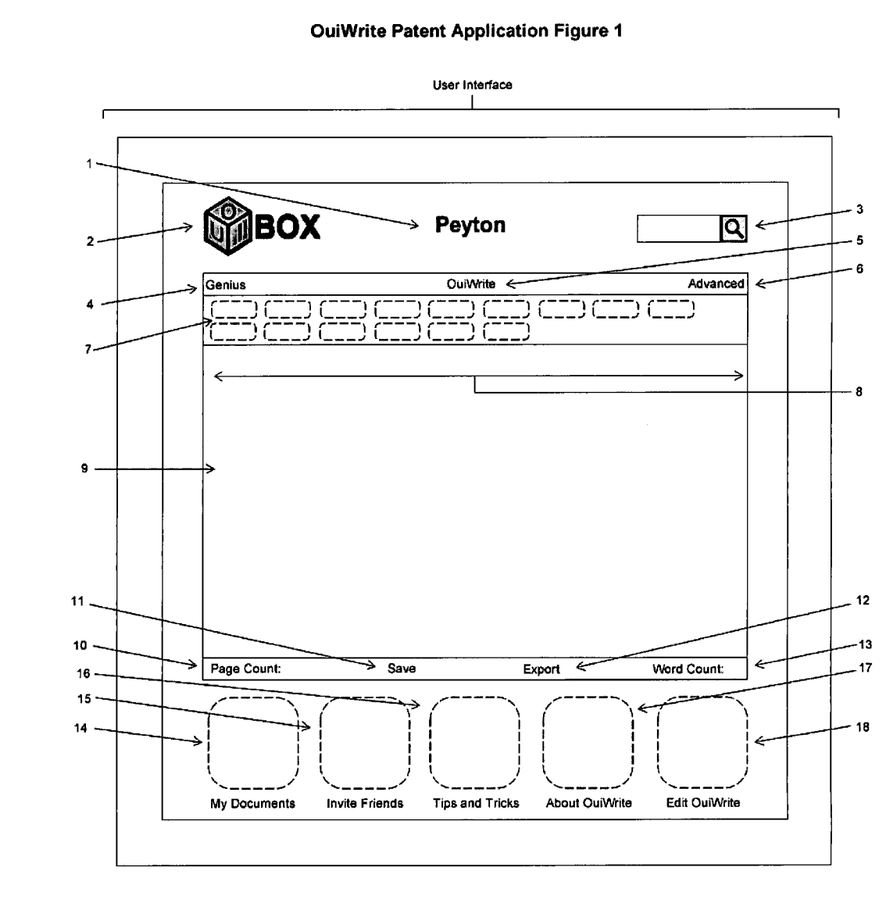
FIG. 1 is a depiction of the user interface of the invention showing user input and selection areas.

FIG. 1 depicts and describes the following components by number corresponding to the following elements of the user interface of the inventions:

1. OuiBox[Trade] Name. This is the first, or primary name of the OuiBox member (the end user).

2. OuiBox [Trade] company logo.

3. Search Box. This allows users to search the OuiBox [Trade] website as well as enter website URLs and visit other websites through the OuiBox portal.

4. This "button" engages the Genius[Trade] feature ofOui-Write[Trade].

5. This states the service's name: OuiWrite[Trade].

6. This "button" labeled "Advanced" engages a panel which allows users to enter header and footer information.

7. Items depicted as dotted rounded rectangles indicate font and other style directed controls.

8. The width of FIG. 8 is 610 pixels and is the measurement of the writing area in the OuiWrite[Trade] terminal.

9. This area is where users input characters to the system.

10. This page counter displays what page the user is on in regards to the final formatted version.

11. This "button" allows users to save their work at any point and also notifies users that their work has automatically been saved every 30 seconds.

12. This "button" allows users to instantly export their work to their local computer hard drive. The file that is exported is a Microsoft Word document type.

13. This word counter displays the number of words the user has input into the system.

14. The "My Documents" section is depicted here by a dotted rounded square outline with the word "My Documents" beneath it. This signifies a "button" that allows users to view past work and manage all written saved documents.

15. The "Invite Friends" section is depicted here by a dotted rounded square outline with the word "Invite Friends" beneath it. This signifies a "button" that allows users to sign into 100 popular websites and invite their contacts posted on those popular 3rd party websites with just one button.

16. The "Tips and Tricks" section is depicted here by a dotted rounded square outline with the word "Tips and Tricks" beneath it. This signifies a "button" that lists text that users may read information regarding OuiWrite and how to improve its functionality for their needs.

17. The "About OuiWrite[Trade]" section is depicted here by a dotted rounded square outline with the word "About OuiWrite[Trade] beneath it. This signifies a "button" that lists text that users may read in regards to what OuiWrite [Trade] is and what the intended purpose is.

18. The "Edit OuiWrite [Trade]" section is depicted here by a dotted rounded square outline with the word "Edit OuiWrite[Trade]" beneath it. This signifies a "button" that opens a panel of options to change various settings within the OuiWrite[Trade] console.

Figure 2:
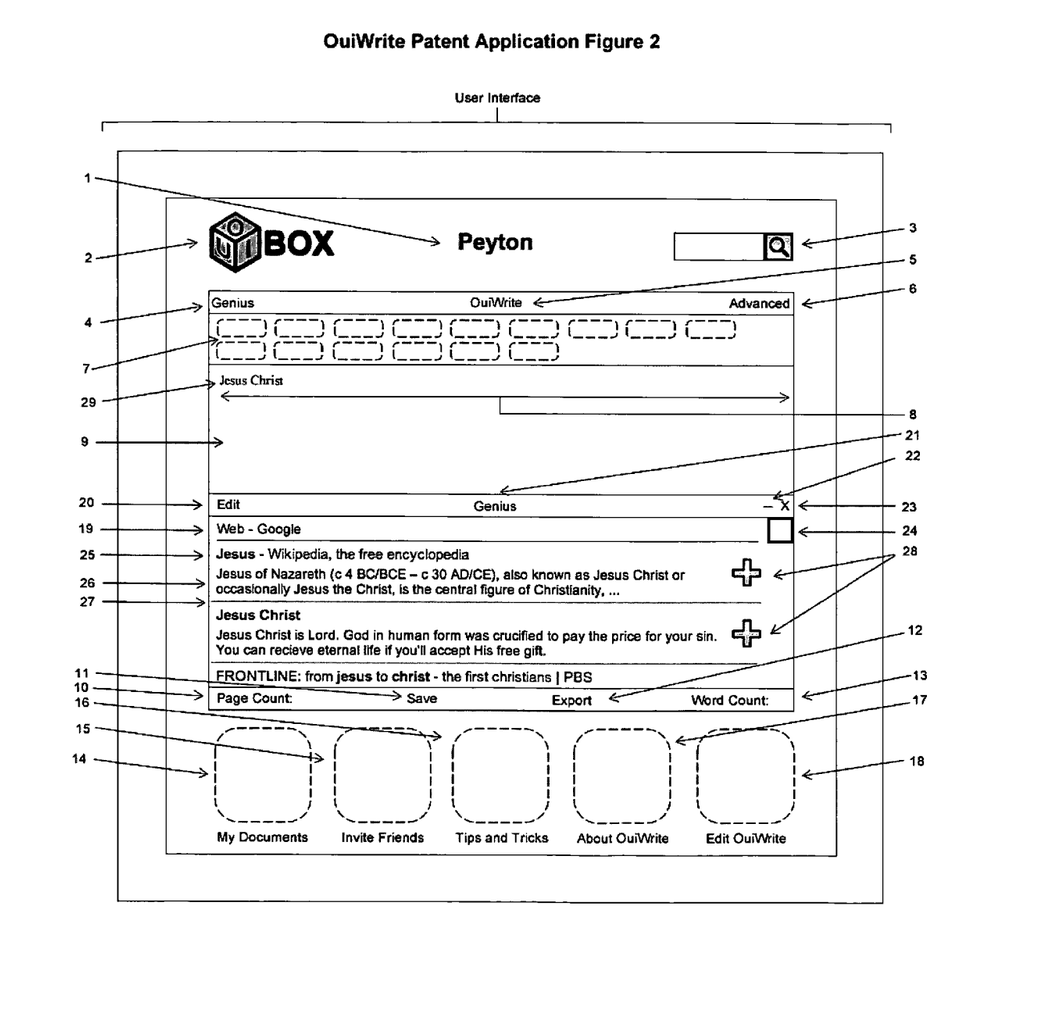
FIG. 2 is a depiction of the user interface in operation, showing the inventions suggestion of information as well as specific user controls to aid in selection or sorting of information.

FIG. 2 depicts and describes the following components by number corresponding to the following elements of the user interface of the invention:

1. OuiBox[Trade] Name. This is the first, or primary name of the OuiBox [Trade] member (the end user).

2. OuiBox[Trade] company logo.

3. Search Box. This allows users to search the OuiBox [Trade] website as well as enter website URLs and visit other websites through the OuiBox portal.

4. This "button" engages the Genius[Trade] feature ofOuiWrite[Trade].

5. This states the service's name: OuiWrite[Trade].

6. This "button" labeled "Advanced" engages a panel which allows users to enter header and footer information.

7. Items depicted as dotted rounded rectangles indicate font and other style directed controls.

8. The width of FIG. 8 is 610 pixels and is the measurement of the writing area in the OuiWrite[Trade] terminal.

9. This area is where users input characters to the system.

10. This page counter displays what page the user is on in regards to the final formatted version.

11. This "button" allows users to save their work at any point and also notifies users that their work has automatically been saved every 30 seconds.

12. This "button" allows users to instantly export their work to their local computer hard drive. The file that is exported is a Microsoft Word document type.

13. This word counter displays the number of words the user has input into the system.

14. The "My Documents" section is depicted here by a dotted rounded square outline with the word "My Documents" beneath it. This signifies a "button" that allows users to view past work and manage all written saved documents.

15. The "Invite Friends" section is depicted here by a dotted rounded square outline with the word "Invite Friends" beneath it. This signifies a "button" that allows users to sign into 100 popular websites and invite their contacts posted on those popular 3rd party websites with just one button.

16. The "Tips and Tricks" section is depicted here by a dotted rounded square outline with the word "Tips and Tricks" beneath it. This signifies a "button" that lists text that users may read information regarding OuiWrite[Trade] and how to improve its functionality for their needs.

17. The "About OuiWrite[Trade]" section is depicted here by a dotted rounded square outline with the word "About OuiWrite[Trader beneath it. This signifies a "button" that lists text that users may read in regards to what OuiWrite[Trade] is and what the intended purpose is.

18. The "Edit OuiWrite [Trade] section is depicted here by a dotted rounded square outline with the word "Edit OuiWrite [Trade]" beneath it. This signifies a "button" that opens a panel of options to change various settings within the OuiWrite[Trade] console.

19. The "Web—Google®" heading is one of many identifiers referring to the type of result that is being presented. The first word, in this case "Web" refers to the subcategory or sub-database of the second word, in this case "Google®".

20. The "Edit" button on the Genius[Trade] window header opens a panel which allows users to further configure settings for OuiWrite[Trade] Genius[Trade].

21. The word GeniusυTrade] signifies the name of the tool that is currently being engaged.

22. The small horizontal line in the right top corner of the Genius[Trade] window allows users to minimize the Genius [Trade] application without turning the application off. The Genius[Trade] web application window then reduces to a single bar at the bottom of the page in order to allow more room for users to write with.

23. The small "X" symbol in the top right corner of the Genius[Trade] window allows users to close the Genius [Trade] web application completely.

24. The small square "box" to the right of the search result heading is a scroll bar, or "scroll box" to reveal more Genius [Trade] results.

25. The first result title is marked in bold, followed by a succinct mention of the website, service or database the information was retrieved from.

26. Under title and information location identifiers, is a brief description of the information that the user may find useful for what they are writing.

27. Between every Genius[Trade] result is a divider bar, simply to organize content most effectively.

28. The "addition symbol" icon to the right of all results functions as a "button" that adds the information found. in the Genius[Trade] result to the written work in the form of an annotation. This annotation appears based on the user defined format. In addition to the annotation, a bibliography entry is made with the same initial click of the addition symbol.

Figure 3:
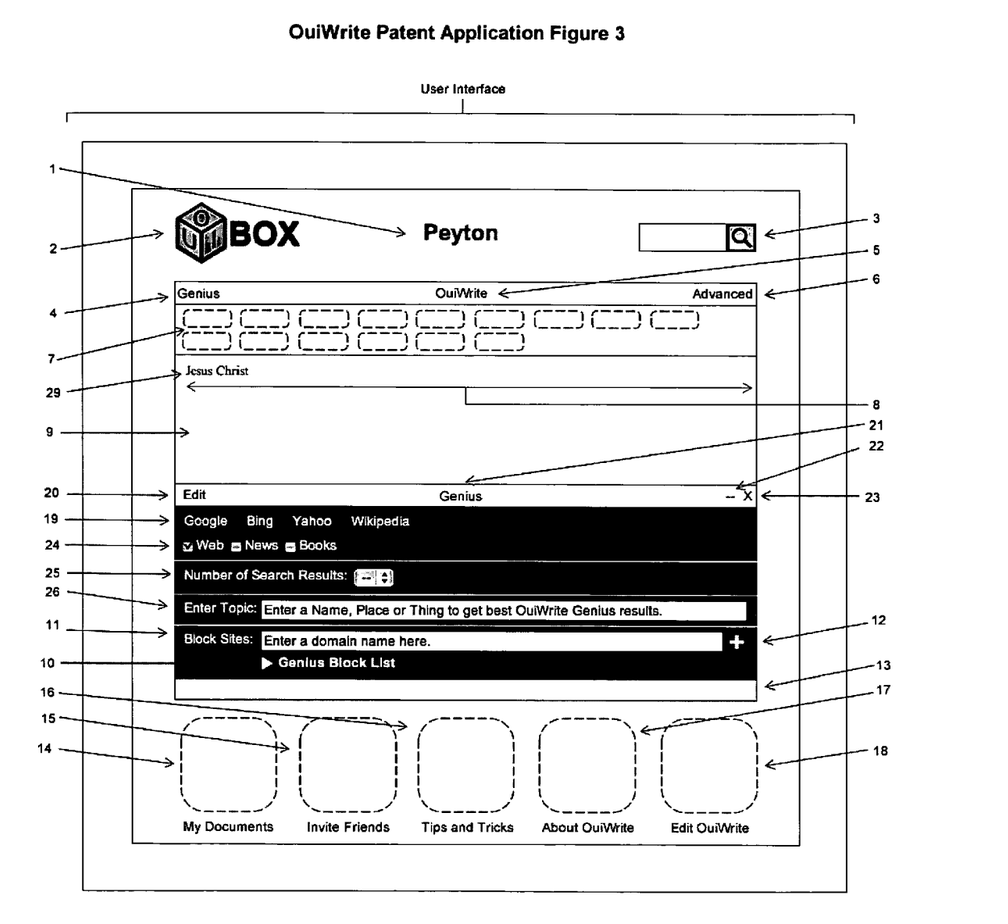
FIG. 3 is a depiction of the invention interface with user controls shown which aid in selection and sorting of information.

FIG. 3 depicts and describes by corresponding number the following functions of the invention functioning with Genius [Trade] features engaged and the "Edit" panel open.

1. OuiBox[Trade] Name. This is the first, or primary name of the OuiBox[Trade] member (the end user).

2. OuiBox[Trade] company logo.

3. Search Box. This allows users to search the OuiBox [Trade] website as well as enter website URLs and visit other websites through the OuiBox[Trade] portal.

4. This "button" engages the "Genius" feature ofOuiWrite [Trade].

5. This states the service's name: OuiWrite[Trade].

6. This "button" labeled "Advanced" engages a panel which allows users to enter header and footer information.

7. Items depicted as dotted rounded rectangles indicate font and other style directed controls.

8. The width of FIG. 8 is 610 pixels and is the measurement of the writing area in the OuiWrite[Trade] terminal.

9. This area is where users input characters to the system.

10. The Genius Block List is where all the websites that the user decides to "block" from the Genius functions are displayed on clicking. Options to remove sites from the Blocked List are available.

11. The "Block Sites" section of OuiWrite[Trade] Genius Edit window allows users to enter a domain name (website name) that the user does not want to have listed in their Genius[Trade] results. All sources coming from sites in the Blocked list will not appear for the user as an option.

12. This "button" in the form of an addition symbol will instantly add the website to the Blocked list after the user enters the name in the appropriate field.

13. This word counter displays the number of words the user has input into the system.

14. The "My Documents" section is depicted here by a dotted rounded square outline with the word "My Documents" beneath it. This signifies a "button" that allows users to view past work and manage all written saved documents.

15. The "Invite Friends" section is depicted here by a dotted rounded square outline with the word "Invite Friends" beneath it. This signifies a "button" that allows users to sign into 100 popular websites and invite their contacts posted on those popular third party websites with just one button.

16. The "Tips and Tricks" section is depicted here by a dotted rounded square outline with the word "Tips and Tricks" beneath it. This signifies a "button" that lists text that users may read information regarding OuiWrite [Trade] and how to improve its functionality for their needs.

17. The "About OuiWrite[Trade]" section is depicted here by a dotted rounded square outline with the word "About OuiWrite[Trade]" beneath it. This signifies a "button" that lists text that users may read in regards to what OuiWrite [Trade] is and what the intended purpose is.

18. The "Edit OuiWrite[Trade]" section is depicted here by a dotted rounded square outline with the word "Edit Oui-Writer[Trade]" beneath it. This signifies a "button" that opens a panel of options to change various settings within the Oui-Write[Trade] console.

19. The database selector allows users to select which databases their search results come from. The ones listed, "Google®", "Bing®", "Yahoo®" and "Wikipedia®" are just some of the free databases available to all users.

20. The "Edit" button on the Genius[Trade] window header opens a panel which allows users to further configure settings for OuiWrite[Trade] Genius[Trade].

21. The word Genius[Trade] signifies the name of the tool that is currently being engaged.

22. The small horizontal line in the right top corner of the Genius[Trade] window allows users to minimize the Genius application without turning the application off. The Genius web application window then reduces to a single bar at the bottom of the page in order to allow more room for users to write with.

23. The small "X" symbol in the top right corner of the Genius[Trade] window allows users to close the Genius [Trade] web application completely.

24. "The subset selector allows users to select or deselect defined parts of the databases available.

25. This simple drop-down menu allows users to choose between 5, 10, 20, 40, 60, 80 or 100 sources from the Genius [Trade] web application.

26. To further clarify for the OuiWrite[Trade] system what the user's central topic of their written work is, there is a text box for the user to update as they wish. This allows the system to learn contextually what the user is trying to convey and deliver even more focused results.

Figure 4:
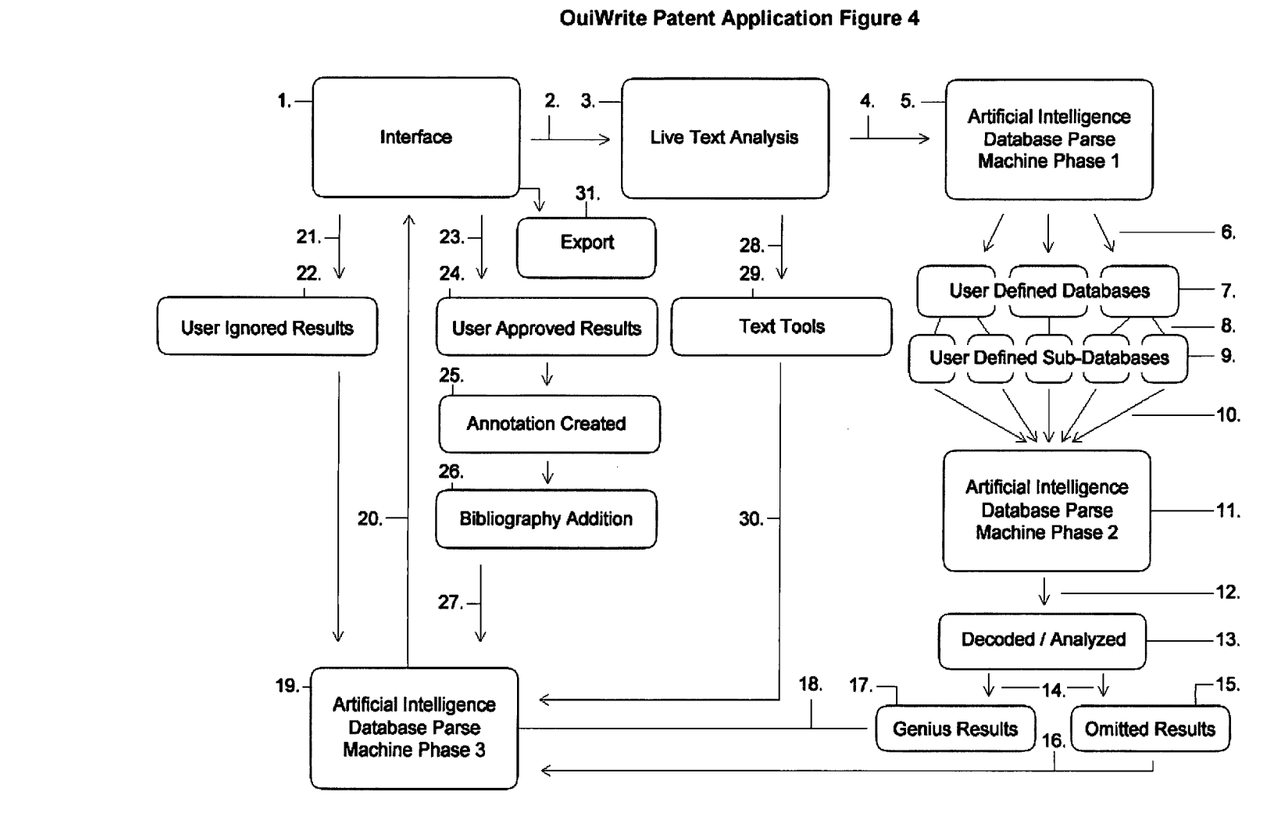
FIG. 4 is a depiction of the logic structure an electronic information flow of the invention including searches and sub-searches, database parses, and handling of user input.

FIG. 4 depicts and describes the overall structure of the invention as well as the flow of information as the invention assists the user in the writing process by the following numbers indicated on the drawing.

1. The OuiWrite[Trade] interface as detailed in FIGS. 1, 2 and 3. The interface serves as a text window for users to input text based information.

2. Signifies the input of text based information.

3. An internal system that reviews spelling, grammar and other aspects of the user's writing habits and offers alternative spellings and cues for alternative grammatical correctness. The Live Text Analysis[Trade] creates a hidden profile of the user's writing habits and can make notes for common mistakes. Automatic spell check and replacement is managed here.

4. The Live Text Analysis[Trade] system sends both the original text supplied by the end user as well as the user's OuiWrite[Trade] generated writing profile to the Artificial Intelligence Database Parse Machine to conduct Phase 1.

5. Once text is received, Phase 1 begins instantly searching the Internet, Intranets and other user defined databases via APIs and other agreements for relevant results for terms selected or given. by the end user. The system converts the user defined text information into JavaScript Object Notation (JSON) format which interacts with these databases on a categorical and technical level.

6. The packets of data received in JSON format from the various databases is then filtered based on user defined areas of interest.

7. The user is given options, both paid and free, of which databases to receive information from. Some of these include Google®, Yahoo®, and. Bing®.

8. Depending on user input, the information is sent to Sub-Databases and duplicates are deleted from the packet selection.

9. The information is passed through. Sub-Databases when available. For example Google® may be a user defined database while Google Books® may be a user defined sub-database.

10. The information from the Sub-Databases is taken and ° given in context to the User Defined Database as well as the user's OuiWrite[Trade] generated writing profile.

11. Phase 2 of the Artificial Intelligence Database Machine takes the information provided by the databases which is still in JSON format and the writing profile of the user, specifically information regarding their previous use of similar referenced results, and organizes it and stores it with a much wider database of user's anonymous writing profiles. The end user's results are then compared to the rest of OuiWrite[Trade] writer's results. The database is then updated by results deemed unlikely to be chosen by the end user and other results that are more likely to be chosen.

12. JSON results alongside the updated user's writer profile are then sent to be decoded and analyzed.

13. All information packets deemed most appropriate for the end user are translated into Hypertext Markup Language (HTML) to be easily accessed by the end user.

14. Results that are deemed most likely to be used by the end user are sent to the Genius[Trade] and results that are deemed unpopular categorically and historically are omitted and categorized by severity in an Omitted Results Database.

15. The Omitted Results are given scores based on the number of times a result is ignored by the individual user and by the entire community of OuiWrite[Trade] users. Blacklisted results (usually identifiable as spam sites) are kept separate from unpopular sites which may still be presented to the end user, however much lower in the list of options.

16. The Omitted. Results are sent back to the Artificial Intelligence Database Parse Machine to further update and focus the scope of results for future OuiWrite[Trade] users and input.

17. The final Decoded OuiWrite[Trade] results are ordered according to popularity categorically and historically.

18. The information is sent alongside Omitted results to the Artificial Intelligence Database Parse Machine for the final phase in organizing and updating the Genius[Trade] database.

19. Phase 3 of the Artificial Intelligence Database Parse Machine integrates the user writing styles and written "voice" to the developed Genius[Trade] results. If a result is not similar in tone or structure to the current written work, it will be added to a temporary omission list. This list is developed for users on a document basis. For example, if the user has a history of using Wikipedia results for many documents but has decided to focus on Academic. Journal articles for the current written work, the Academic Journals will appear more prominently and blogs, Wikipedia® and other unproved results will be omitted or less prominent.

20. The information is then delivered to the end user in a list format to be used.

21. Results that are ignored or "scrolled past" are sent to a temporary database for ignored results for that particular document.

22. The User ignored Results are sent to the Artificial Intelligence Database Parse Machine to update the database for results based on the same particular document. These results are analyzed based on "hover over time". or the time a user hover their cursor over the result, and then ignores it, or simply ignores it completely. or if the user scrolls past the result completely. Each instance is scaled and used in future Database decisions.

23. If the user selects a result from the Genius[Trade] and database of provided selections, it is then added to the database of all. OuiWrite[Trade] user's anonymous information.

24. The User Approved Results are noted for their type both categorically and for written style and passed on to Phase 3 of the Artificial Intelligence Database for improved performance.

25. The annotation of the selected source is instantly added to the written work at the end of the most recent word entered.

26. The result is added to a bibliography that uses the pre-selected style of the document.

27. The information for both the selected result is sent back to the Artificial Intelligence Database to update the users writing profile as well as adding the result to the larger database of anonymous information from all OuiWrite[Trade] users.

28. The text analysis is sent to various text tools live as the user types.

29. Grammar check, spell check, as well as an instant conversion into HTML, for copy and paste purposes are made available.

30. Information on the user's writing styles and tone are added to the Artificial Intelligence Database to better determine the writer's intent on the current written document. For example, if the document is written in second person, the system will understand that the tone and style are more casual in nature and supply the user with more casual results (blogs and Wikipedia® instead of newspapers and scholarly articles).

31. At any point during the writing process, the author may decide to export their written work by clicking the "Export" button through the OuiWrite[Trade] interface. The exported document is fully formatted and saved as a .DOC file which is a widely used standard file format for Microsoft® Word® and Microsoft® Office® products.

Figure 5:
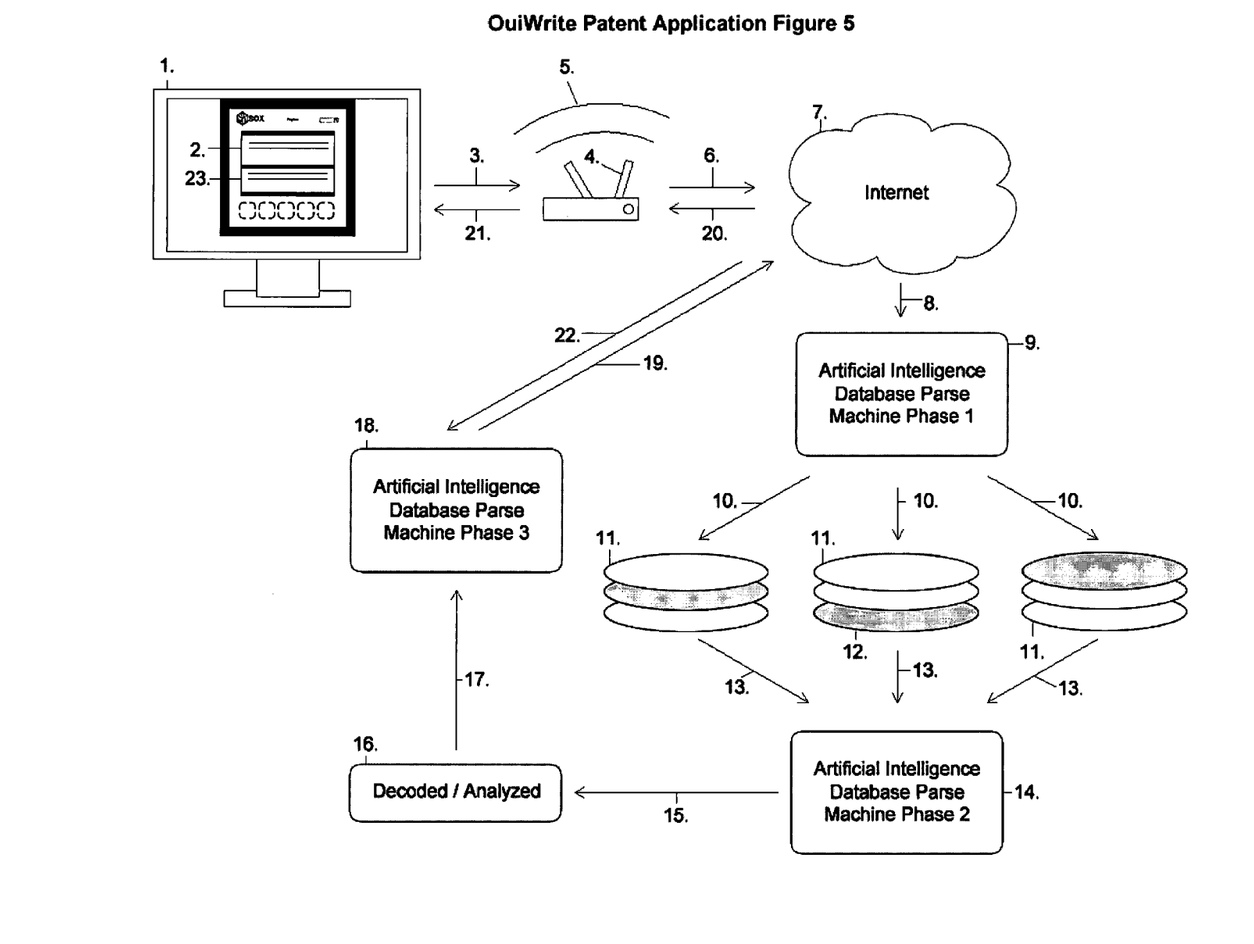
FIG. 5 is a general depiction of invention showing a broad view of the operation of the invention as it relates to connection with the interne and the phase analyses performed by the invention.

FIG. 5 depicts by corresponding number the process from user interface through wireless Internet connection to data streamed back to the user console.

1. The computer console with monitor visible.
2. Text based data the end user provides is entered.
3. The computer console uses wireless "wifi" technology or wired technology connect to a wireless or wired cable modem, router, Ethernet, or other means of Internet interaction.
4. The wireless or wired cable modem, router, Ethernet, etc is connected to an outside source as a data transmission vehicle to an ISP (Internet Service Provider).
5. For wireless routers, this depicts the invisible information stream from and to the unit. The signals communicate with other "wifi" devices to deliver the Internet.
6. The ISP supplies the modem, router or Ethernet with a connection to the Internet.
7. The Internet is a massive and worldwide network of servers (computers) that house data on billions of hard drives. This data is then accessed. shared and created by the end users
8. The Internet consists of the web application and set of processes known as OuiWrite[Trade]. As the end user accesses OuiWrite[Trade] and engages the Genius[Trade] menu of processes.
9. The Artificial Intelligence Database Parse Machine is a component of the OuiWrite[Trade] Genius[Trade] functions. It carries our pre-defined tasks the end user provides. Phase 1 begins instantly searching the Internet, Intranets and other user defined databases via APIs and other agreements for relevant results for terms selected or given by the end user. The system converts the user defined text information into JSON format which interacts with these databases on a categorical and technical level.
10. Based on text inputs by the end user, the system searches many databases and information available on the Internet to deliver the most relevant and useful results to the end user.
11. These disks represent many million servers and the vast bodies of information contained in each.
12. Gray disks represent the information that may be useful to the end user.
13. All information deemed useful by the Artificial Intelligence Database Parse Machine is then. forwarded to Phase 2.
14. Phase 2 of the Artificial intelligence Database Machine takes the information provided by the databases which is still in JSON format and the writing profile of the user, specifically information regarding their previous use of similar referenced results, and organizes it and stores it with a much wider database of user's anonymous writing profiles. The end user's results are then compared to the rest of OuiWrite[Trade] writer's results. The database is then updated by results deemed unlikely to be chosen by the end user and other results that are more likely to be chosen.
15. JSON results alongside the updated user's writer profile are then sent to be decoded and analyzed.
16. All information packets deemed most appropriate for the end user are translated into HTML to be easily accessed by the end user.
17. The information is sent to the Artificial Intelligence Database Parse Machine for the final phase in organizing and updating the Genius[Trade] database.
18. Phase 3 of the Artificial Intelligence Database Parse Machine integrates the user writing styles and written "voice" to the developed Genius[Trade] Results. If a result is not similar in tone or structure to the current written work, it will be added to a temporary omission list. This list is developed for users on a document basis. For example, if the user has a history of using Wikipedia® results for many documents but has decided to focus on Academic Journal articles for the current written work, the Academic Journals will appear more prominently and blogs. Wikipedia® and other unproved results will be omitted or less prominent.
19. The information. from the Artificial Intelligence Database Parse Machine is finally sent back to end user through their Internet connection.
20. The server which holds the information developed and retrieved by the OuiWrite[Trade] Genius[Trade] functions and technology which make its processes function, are sent via information packets to the user's personal modern, router, Ethernet or other means of connecting to the Internet.
21. The data is delivered to the user in graphical and textual fashion through the OuiWrite[Trade] user Interface.

22. Information ignored by the end user is sent back to the Artificial Intelligence Database Parse Machine to update the system for future packet delivery decisions.

23. The final information is delivered on-screen alongside the end user's entered text. All processes are completed live and updated live as the user enters text based information.

The invention allows users to enter certain information and settings to guide the writing process. The user may select the type of document they wish to create (for example: Research Paper, Essay, News Article, Book, Book Report, Bibliography, Letter, and Resume). The invention then creates automatic formatting restraints for the user to write the written work within.

The invention provides functions to the user, which assists throughout the process of writing the written work. The invention of both machine and computer-implemented process is directed by a computer code. This controls the conversion of data into digital signals which change the configuration of the machines Random Access Memory (RAM) and manipulate information in digital bits and bytes to cause physical changes in the machine. The computer-implemented process then further transforms the information stored in bits and bytes into digital packets of information expressed in JSON format to HTML format which causes a change in the user interface which can be understood by the user. The function performed by these information transfers and changes of the physical properties of the machine by the computer-implemented process is a new type of integration and implementation of information into a written work being authored by the user with the help of the invention.

As the author writes the written work the invention analyzes the user's writing habits by noticing patterns, key words, and repetition in order to better perform search and analysis functions. This is referenced as Artificial Intelligence Database Parse Machine Phase 1 (Phase 1) (depicted in FIG. 4 as number 5; depicted in FIG. 5 as number 9) in the drawings. The information the user is writing is converted by the invention into JSON format code. The invention commences a search of the Internet, or another user selected database or source. The invention searches the terms which the user is entering as they write. The invention searches in a browser or other application by means of a connection to other devices, routers, servers or other hardware, which connects the machine to the world wide web or the selected database. In the preferred embodiment of searching three (3) search engines (for example: Google®, Bing®, and Yahoo®) simultaneously, the invention utilizes each search engine's application programming interface (API) to obtain search results for the terms selected or given, results are then given in the JSON format, which the invention converts to HTML which makes a physical change in the display presented to the user through the interface, which the user is capable of understanding. During the above exchange of information through each search engine's API the invention uses the search engines to automatically search terms, in real time, as the author is writing. The machine is automatically directed to search for the word sequences being entered by the user.

An anonymous database of writing profiles is maintained by the invention. As search results are returned from up to three simultaneous databases or search engines the invention organizes the results of the search and uses the results to update an anonymous database of writing profiles, this is depicted as Artificial Intelligence Database Parse Machine Phase 2 (Phase 2). (depicted in FIG. 4 as number 11; depicted in FIG. 5 as number 14). This database is used by the invention to further rank sources by popularity among users. The machine then matches data returned from the searches with data from the user's writing analyzed in Phase 1. Data is matched between Phase 1 and Phase 2 in order to exclude results which are deemed uninteresting or not pertinent to the user's writing habits.

Search results from the search engine or database are then sorted and ranked by the invention based on popularity and relevancy. The invention then decodes the JSON code and returns in back to HTML format that is then sent through another level of machine analysis in Artificial Database Parse Machine Phase 3 (Phase 3) (depicted in FIG. 4 as number 19; depicted in FIG. 5 as number 18). This integrates the users writing style into the results. The tone of the current user writing is analyzed and matched to the results. For example: if the user usually writes in unformatted informal style for blog posting, then the information sorted and offered to the user in Phase 3 would be informal blogs and non-scholarly sources such as Wikipedia. If the user begins writing a MLA formatted scholarly writing then the invention would adjust to offer scholarly journal articles. The anonymous database of writing profiles also is used to help suggest commonly used sources for users who are writing on the same topics or the same styles of writings. The result is that the more the invention is used, the more accurate and relevant the sources returned to the user will be. The invention uses the collective non-personal usage information from all users to from the anonymous database of writing profiles in order to determine the type of written material being written and predict which packets of digital information are most commonly used in similar circumstances.

The databases described in Phase 1, Phase 2, and Phase 3. work together to store different levels of user information as follows:

1. The first database holds the users previous "knowledge" about their writing style and uses that to predict the results that are most likely going to be chosen by them.

2. The second database contains all the writing history/style of all the invention's users at large to use that information anonymously for the sake of making better selections for the user to choose from.

3. The third database holds temporary and document specific writing styles. This is for the user who writes in an academic voice for a research paper and needs scholarly articles, and writes a letter with the invention in a very casual tone.

The highest ranked sources produced by the above described process of Phase 1, Phase 2, and Phase 3, are then suggested to the user in a dialogue box or screen window which is readable on the interface.

The user may then select whether to accept or decline the suggested information or citation. If the author rejects the information or citation, it is not incorporated into the written work. However, if the user selects the automatically suggested information or citation, the information and/or citation is inserted into the written work, in the proper format according to the selected style as described further below.

As the user continues to use the computer-implemented process, the invention recognizes patterns in the user's individual writing habits and truncates information search result suggestions so that over time the invention only delivers search result packets that reflect the evolving interests and habits of the user. This is accomplished by the three Phases described above as they relate both to the individual user's writing habits and the anonymous database of writing profiles. In this way the invention can adjust to specific user activity and produce relevant rankings based on the user's searches and selections of previously suggested information.

As the author is typing their work the machine places all characters, letters, and words into a proper format (ex. APA, MLA, Chicago, or free form) which the author has pre-selected. The invention allows users to automatically format one of eight (8) different documents including Research Paper, Essay, News Article, Book, Book Report, Bibliography, Letter and Resume.

The invention turns user entered information into digital bits and bytes which change the pattern of the machine's internal hard drive and RAM structure in such a way that user entered information is also entered into bits and bytes which physically change the structure of the machines internal memory devices and together these changes produce data in a form which is displayed to the user, and can be exported by the user, in the pre-selected style format.

The invention automatically saves the users work every thirty (30) seconds as the user creates the written work by transferring the digital information contained in RAM onto permanent hard disc space which physically alters the composition of the memory device in a digital pattern which is then readable in the future.

In the preferred embodiment, a computer Internet browser or other application is directed to communicate with a machine which is guided by the copyrighted code, which can be encapsulated in an application to run online or on the user's machine itself. The copyrighted computer code directs the machine to open a writing window from which the user can select the desired style format for the written work. The invention pre-populates information fields on a document "set up" page from information available from a user's social networking site or pre-entered information. The user also selects the desired style format the document should be written in (MLA, APA, Chicago, or Free Form).

As the user continues to author the work, all words are automatically formatted according to stylistic requirements. The copyrighted computer code directs the above described search procedures in the background. These search procedures use existing search technology to search words and word sequences that the author is entering. The invention automatically finds sources of information based on the context of what the user is writing across 3 or more different search engines and seven categories of sources. Specialty search engines for various types of professionals (ex. Westlaw®, LexisNexis®) may also be pre-selected by the user and searched as the writing is created. The search procedure can search in any search engine, for example Google® or Google Scholar® for entries that may be sources for the information the user is entering; any database can be selected. The invention also allows users to enter a "Topic" of written work to get even more precise information results.

The user is then prompted with the information whenever the user needs additional information. The user is also prompted with the source of the information found. The user may then select any of the suggested information and citations. Once the user selects the citation desired, the invention is directed by the copyrighted computer code to place a citation to the information into the written work. The citation is correctly formatted according to the style previously selected by the user. The citation is added to the written work and to the bibliography or other list of sources, as appropriate. The invention may suggest relevant information and next-steps to be included into the written work in addition to simply citing the already entered information for example:

User types: "Abraham Lincoln was born in . . . "

The device can be then prompted to make suggestions for Abraham Lincoln's birthday.

The invention directed by the copyrighted computer code, or similar directing program, prompts the user with both the desired information obtained from a contemporaneous automated search of the desired database or search engine which is run in the background by the machine.

If a user wishes to block a certain site from coming up in a search (ex. Wikipedia®) the invention allows the user to create a "block list" that features a list of websites that the user wants to remove from possible results.

All actions that the machine and computer-implemented process performs are done in real time and with automatic saving of the written work every thirty (30) seconds. This gives a user the ability to work on a written work in very short increments of time, from remotely accessed devices without concern for loosing information due to a loss of wireless connection or battery failure on a portable device. Results are refreshed in real time and seamlessly integrated into the user's written work. The invention also performs grammar and spell check on the written work.

The usefulness of this invention extends to nearly every professional field, a medical professional can use the computer implemented process and machine described above to assist in finding a prescription or diagnosis for a patient. In the medical embodiment, a medical professional would begin entering information regarding their patient. As the user enters information, the machine or computer-implemented process will use the entered information to search through databases of possible diagnoses or prescriptions. The invention then will make suggestions to the medical professional based upon the relevance of the information found and other user defined presets.

The invention can be used as above except in the legal field to search databases of case precedent such as Westlaw® or LexisNexis® and using information gathering and sorting methods as described above to suggest the most relevant information to the user. Any user selected information may then be incorporated into the user's written work in the proper citation format.

All Databases described for the invention are MYSQL, a standard in the industry. They simply hold the information. However, one skilled in the art will recognize and appreciate databases are interchangeable and other database embodiments are and may be available.

Also the invention contains a "Brain" that governs the information. The Brain which is tacked on each database through PHP 5, JavaScript, JSON, AJAX and other Internet standard programming languages uses the user defined search areas in order to complete the search, and then cancels out various results based on the Block List (that the user creates) and also cancels out, or moves down in the list, results that historically have not proven to be used by users, or specifically the one end user in question. All these variables can be changed by the owner or manager of the invention. A variable would include "how many spaces a "cancelled out" site would. appear in the list of results, if at all?" among any number of other variables.

The Brain uses database data on how many times a user has ignored, scrolled pass, or used a source from the machine. Based on any of these actions, the source is then "rated" a number. If the source has been used many times by many people. the higher the likelihood it will be used again. If the source has been changed on the website it was received from, it is then looked at as a new source and the rating is erased. Ignoring the reference is given very little negative effect, but passing by the result carries more weight because the user consciously did not use the result after viewing it. All these scoring mechanisms can be changed. the thresholds for the points can be manipulated by the inventions owners and administrators, and will be in order to offer the most useful product.

The present invention can be implemented by an apparatus for performing the operations herein. This apparatus may be specially constructed for the required purposes, or it may comprise a general-purpose computer, selectively activated or reconfigured by a computer program stored in the computer or run as a web based application. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The embodiments herein are not related to any specific computer or type of computer. Various general purpose systems may be used with programs in accordance with the teachings herein, or it may prove convenient to construct more specialized apparatus to perform the required method. For example, any of the methods according to the present invention can be implemented in hardwired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be guided using computer software to transfer information and change the physical structures of the machines and interfaces involved. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein, however the inventor recommends the AJAX programming language because of the real time characteristics offered by this program. Furthermore, it is common in the art to speak of software, in one form or another (e.g., program, procedure, application, driver . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machinereadable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Reference has been made to LAN (Local Area Network) and WAN (Wide Area Network). What is to be understood, as is understood by those of ordinary skill in the art, is that LAN and WAN are relative terms. For example, the Internet may be considered a WAN with respect to a large corporate network, and the large corporate network may be considered a WAN with respect to a department network within the large corporation network. Likewise, the small department network may be considered a LAN with respect to a large corporate network, and the large corporate network may be considered a LAN when compared to the Internet. As such, what one is to appreciate, is that where discussions have related LANs to WANs, they are relating smaller networks to larger networks, and that this comparison is not fixed as to where the comparison takes place. Thus, one network may appear as a WAN to a smaller network, and yet to another network appear as a LAN. What is to be appreciated is that in the art, the words sometimes have meanings commensurate with the surrounding environment, and yet often the words are used interchangeably without respect to the specific structure or environment, i.e. one of ordinary skill in the art understands the use and meaning.

OuiWrite[Trade] is the trademark/tradename, owned by the inventor, for the invention. OuiBox[Trade] is the tradename/trademark for the company owning the invention and the name of the a social networking website which the inventor maintains, user information from this social networking website can be integrated into the user fields of the invention. One skilled in the art will appreciate that this is a relatively simple data exchange and field population between browsers and websites is a common process.

Genius[Trade] is the trademark/tradename, owned by the inventor, for a feature of the invention, which allows users more control over results and customized searching as described in this Specification.

All other trademarks/tradenames listed in this specification are the property of their respective owners and are listed as examples of popular resources, databases, formats, or related products. It will be appreciated by one skilled in the art, and the ordinary consumer, that there are many similar products offered in each of these fields and nothing in this application is meant to indicate that any of these trademarks/tradenames is a generic term for a search engine, database, or similar resource, product, service, or other embodiment.

One skilled in the art will appreciate that while the preferred embodiment described suggests the use of HTML, JSON, AJAX, and other similar programming languages, programming languages and digital information formats are interchangeable and the use of other programming languages and codes as substitutes and compliments for the invention is obvious.

Thus, a machine and computer-implemented process for providing a user with information suggestions and incorporation, information sorting and gathering assistance, citation suggestion and incorporation, and formatting of a written work have been described.

The invention claimed is:

1. A computer implemented method of assisting a user in preparing a written document, comprising:
    receiving a user selected citation format for a document;
    determining a user writing style specific to said document via analysis of input entered by said user into said document wherein said user writing style determination is based on formatting applied to said document by said user based on grammatical person of textual input of said input entered in said document by said user;
    receiving one or more terms entered by said user into said document;
    submitting search data indicative of said terms to a plurality of reference sources via one or more application programming interface;
    receiving search results from said reference sources, said search results based on said search data and responsive to said submitting search data indicative of said terms;
    identifying a subset of said search results;
    providing aspects of each of said search results identified in said subset to said user for display along with said document;
    wherein which of said search results are identified in said subset is based on said user writing style specific to said document; and
    wherein each of said search results provided in said subset is provided in combination with an indication of from which of said reference sources said search result originates;
    receiving a user selection to add a selected one of said search results of said subset to said document; and
    inserting, in response to said user selection, text indicative of said selected one of said search results into said document, said text including a citation of said selected one of said search results in said user selected citation format.

2. The method of claim 1, wherein which of said search results are provided in said subset is based on said reference sources of said search results.

3. The method of claim 2, wherein which of said search results are provided in said subset is based on a reference source style of each of said reference sources as compared to said user writing style specific to said document.

4. The method of claim 1, further comprising associating each of one or more of said reference sources with at least one style of writing.

5. The method of claim 4, wherein which of said search results are provided in said subset is based on said style of writing of said search results as compared to said user writing style specific to said document.

6. The method of claim 1, wherein said user writing style determination is based on grammatical person of textual input of said input entered in said document by said user.

7. The method of claim 1, wherein said user selected citation format is selected from at least one of APA and MLA.

8. The method of claim 1, further comprising providing a central topic text entry to said user and receiving central topic text entered into said central topic text entry, said central topic text indicative of a central topic of said document and influencing said search results.

9. The method of claim 1, wherein said text inserted into said document further includes actual search result text from said selected one of said search results.

10. The method of claim 1, further comprising enabling user selection of said reference sources from a predefined listing of potential reference sources.

11. The method of claim 1, wherein which of said search results are provided in said subset is additionally based on which of said reference sources said user utilized in combination with other documents.

12. The method of claim 10, wherein which of said search results are provided in said subset is additionally based on which of said reference sources said user declined to use in combination with other documents.

13. A system including one or more processors operable to execute instructions to:
    receive a user selected citation format for a document;
    determine a user writing style specific to said document via analysis of input entered by said user into said document wherein said user writing style determination is based on formatting applied to said document by said user based on grammatical person of textual input of said input entered in said document by said user;
    receive one or more terms entered by said user into said document;
    submit search data indicative of said terms to a plurality of reference sources via one or more application programming interface;
    receive search results from said reference sources, said search results based on said search data and responsive to said submitting search data indicative of said terms;
    identify a subset of said search results;
    provide aspects of each of said search results identified in said subset to said user for display along with said document;
    wherein which of said search results are identified in said subset is based on said user writing style and tone specific to said document; and
    wherein each of said search results provided in said subset is provided in combination with an indication of from which of said reference sources said search result originates;
    receive a user selection to add a selected one of said search results of said subset to said document; and
    insert, in response to said user selection, text indicative of said selected one of said search results into said document, said text including a citation of said selected one of said search results in said user selected citation format.

14. The system of claim 13, wherein which of said search results are provided in said subset is based on said reference sources of said search results.

15. The system of claim 14, wherein which of said search results are provided in said subset is based on a reference source style of each of said reference sources as compared to said user writing style specific to said document.

16. The system of claim 13, wherein said instructions further include instructions to associate each of one or more of said reference sources with at least one style of writing.

17. The system of claim 16, wherein which of said search results are provided in said subset is based on said style of writing of said search results as compared to said user writing style specific to said document.

18. A non-transitory computer readable storage medium, storing electronic instructions to perform a method, the method comprising:
- receiving a user selected citation format for a document;
- determining a user writing style specific to said document via analysis of input entered by said user into said document wherein said user writing style determination is based on formatting applied to said document by said user based on grammatical person of textual input of said input entered in said document by said user;
- receiving one or more terms entered by said user into said document;
- submitting search data indicative of said terms to a plurality of reference sources via one or more application programming interface;
- receiving search results from said reference sources, said search results based on said search data and responsive to said submitting search data indicative of said terms;
- identifying a subset of said search results;
- providing aspects of each of said search results identified in said subset to said user for display along with said document;
- wherein which of said search results are identified in said subset is based on said user writing style specific to said document; and
- wherein each of said search results provided in said subset is provided in combination with an indication of from which of said reference sources said search result originates;
- receiving a user selection to add a selected one of said search results of said subset to said document; and
- inserting, in response to said user selection, text indicative of said selected one of said search results into said document, said text including a citation of said selected one of said search results in said user selected citation format.

* * * * *